United States Patent
Lu et al.

(10) Patent No.: US 8,446,470 B2
(45) Date of Patent: May 21, 2013

(54) COMBINED RGB AND IR IMAGING SENSOR

(75) Inventors: Yuesheng Lu, Farmington Hills, MI (US); Michael J. Higgins-Luthman, Livonia, MI (US); William R. Livengood, Grand Blanc, MI (US); James Daniel Harris, Noblesville, IN (US)

(73) Assignee: Magna Electronics, Inc., Holland, MI (US)

( * ) Notice: Subject to any disclaimer, the term of this patent is extended or adjusted under 35 U.S.C. 154(b) by 324 days.

(21) Appl. No.: 12/681,204

(22) PCT Filed: Oct. 3, 2008

(86) PCT No.: PCT/US2008/078700
§ 371 (c)(1),
(2), (4) Date: May 28, 2010

(87) PCT Pub. No.: WO2009/046268
PCT Pub. Date: Apr. 9, 2009

(65) Prior Publication Data
US 2010/0289885 A1    Nov. 18, 2010

Related U.S. Application Data

(60) Provisional application No. 60/977,430, filed on Oct. 4, 2007.

(51) Int. Cl.
*H04N 7/18*    (2006.01)
(52) U.S. Cl.
USPC ............................. 348/148; 348/345; 348/61
(58) Field of Classification Search
USPC ........................................ 348/61, 148, 345
See application file for complete search history.

(56) References Cited

U.S. PATENT DOCUMENTS

| 2,632,040 A | 3/1953 | Rabinow |
| 2,827,594 A | 3/1958 | Rabinow |

(Continued)

FOREIGN PATENT DOCUMENTS

| DE | 4107965 | 9/1991 |
| DE | 4118208 | 11/1991 |

(Continued)

OTHER PUBLICATIONS

Article entitled "Generation of Vision Technology," published by VLSI Vision Limited, publication date unknown.

(Continued)

*Primary Examiner* — Phuoc Nguyen
(74) *Attorney, Agent, or Firm* — Gardner, Linn, Burkhart & Flory, LLP

(57) ABSTRACT

An imaging system suitable for use in a vehicle includes an imaging sensor having a two-dimensional array of photosensing elements, an image processor for processing image data captured by the imaging sensor, and a display for displaying images responsive to the image processor. The array has a plurality of sub-arrays, with each of the sub-arrays having a first pixel sensing primarily a first color, a second pixel sensing primarily a second color, a third pixel sensing primarily a third color and a fourth pixel sensing primarily infrared radiation. The image processor processes the output of the fourth pixel to determine an infrared component of the imaged scene and subtracts the infrared component from the outputs of the first, second and third pixels to obtain a more accurate or true color response for the pixels and to limit or avoid infrared color wash-out.

16 Claims, 8 Drawing Sheets

U.S. PATENT DOCUMENTS

| | | |
|---|---|---|
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,238,760 A | 12/1980 | Carr et al. |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,388,701 A | 6/1983 | Aichelmann, Jr. et al. |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,140,465 A | 8/1992 | Yasui et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |

| | | | | | | |
|---|---|---|---|---|---|---|
| 5,351,044 A | 9/1994 | Mathur et al. | | 5,835,255 A | 11/1998 | Miles |
| 5,355,118 A | 10/1994 | Fukuhara | | 5,837,994 A | 11/1998 | Stam et al. |
| 5,374,852 A | 12/1994 | Parkes | | 5,844,505 A | 12/1998 | Van Ryzin |
| 5,386,285 A | 1/1995 | Asayama | | 5,844,682 A | 12/1998 | Kiyomoto et al. |
| 5,394,333 A | 2/1995 | Kao | | 5,845,000 A | 12/1998 | Breed et al. |
| 5,406,395 A | 4/1995 | Wilson et al. | | 5,848,802 A | 12/1998 | Breed et al. |
| 5,410,346 A | 4/1995 | Saneyoshi et al. | | 5,850,176 A | 12/1998 | Kinoshita et al. |
| 5,414,257 A | 5/1995 | Stanton | | 5,850,254 A | 12/1998 | Takano et al. |
| 5,414,461 A | 5/1995 | Kishi et al. | | 5,867,591 A | 2/1999 | Onda |
| 5,416,313 A | 5/1995 | Larson et al. | | 5,877,707 A | 3/1999 | Kowalick |
| 5,416,318 A | 5/1995 | Hegyi | | 5,877,897 A | 3/1999 | Schofield et al. |
| 5,416,478 A | 5/1995 | Morinaga | | 5,878,370 A | 3/1999 | Olson |
| 5,424,952 A | 6/1995 | Asayama | | 5,883,739 A | 3/1999 | Ashihara et al. |
| 5,426,294 A | 6/1995 | Kobayashi et al. | | 5,884,212 A | 3/1999 | Lion |
| 5,430,431 A | 7/1995 | Nelson | | 5,890,021 A | 3/1999 | Onoda |
| 5,434,407 A | 7/1995 | Bauer et al. | | 5,896,085 A | 4/1999 | Mori et al. |
| 5,440,428 A | 8/1995 | Hegg et al. | | 5,899,956 A | 5/1999 | Chan |
| 5,444,478 A | 8/1995 | Lelong et al. | | 5,914,815 A | 6/1999 | Bos |
| 5,451,822 A | 9/1995 | Bechtel et al. | | 5,923,027 A | 7/1999 | Stam et al. |
| 5,457,493 A | 10/1995 | Leddy et al. | | 5,929,786 A | 7/1999 | Schofield et al. |
| 5,461,357 A | 10/1995 | Yoshioka et al. | | 5,940,120 A | 8/1999 | Frankhouse et al. |
| 5,461,361 A | 10/1995 | Moore | | 5,949,331 A | 9/1999 | Schofield et al. |
| 5,469,298 A | 11/1995 | Suman et al. | | 5,956,181 A | 9/1999 | Lin |
| 5,471,515 A | 11/1995 | Fossum et al. | | 5,959,367 A | 9/1999 | O'Farrell et al. |
| 5,475,494 A | 12/1995 | Nishida et al. | | 5,959,555 A | 9/1999 | Furuta |
| 5,487,116 A | 1/1996 | Nakano et al. | | 5,963,247 A | 10/1999 | Banitt |
| 5,498,866 A | 3/1996 | Bendicks et al. | | 5,964,822 A | 10/1999 | Alland et al. |
| 5,500,766 A | 3/1996 | Stonecypher | | 5,971,552 A | 10/1999 | O'Farrell et al. |
| 5,510,983 A | 4/1996 | Iino | | 5,986,796 A | 11/1999 | Miles |
| 5,515,448 A | 5/1996 | Nishitani | | 5,990,469 A | 11/1999 | Bechtel et al. |
| 5,521,633 A | 5/1996 | Nakajima et al. | | 5,990,649 A | 11/1999 | Nagao et al. |
| 5,528,698 A | 6/1996 | Kamei et al. | | 6,001,486 A | 12/1999 | Varaprasad et al. |
| 5,529,138 A | 6/1996 | Shaw et al. | | 6,009,336 A * | 12/1999 | Harris et al. .................. 455/566 |
| 5,530,240 A | 6/1996 | Larson et al. | | 6,020,704 A | 2/2000 | Buschur |
| 5,530,420 A | 6/1996 | Tsuchiya et al. | | 6,049,171 A | 4/2000 | Stam et al. |
| 5,535,314 A * | 7/1996 | Alves et al. .................... 382/165 | | 6,066,933 A | 5/2000 | Ponziana |
| 5,537,003 A | 7/1996 | Bechtel et al. | | 6,084,519 A | 7/2000 | Coulling et al. |
| 5,539,397 A | 7/1996 | Asanuma et al. | | 6,087,953 A | 7/2000 | DeLine et al. |
| 5,541,590 A | 7/1996 | Nishio | | 6,097,023 A | 8/2000 | Schofield et al. |
| 5,550,677 A | 8/1996 | Schofield et al. | | 6,097,024 A | 8/2000 | Stam et al. |
| 5,555,312 A | 9/1996 | Shima et al. | | 6,116,743 A | 9/2000 | Hoek |
| 5,555,555 A | 9/1996 | Sato et al. | | 6,118,383 A | 9/2000 | Hegyi |
| 5,568,027 A | 10/1996 | Teder | | 6,124,647 A | 9/2000 | Marcus et al. |
| 5,574,443 A | 11/1996 | Hsieh | | 6,124,886 A | 9/2000 | DeLine et al. |
| 5,581,464 A | 12/1996 | Woll et al. | | 6,139,172 A | 10/2000 | Bos et al. |
| 5,594,222 A | 1/1997 | Caldwell | | 6,144,022 A | 11/2000 | Tenenbaum et al. |
| 5,614,788 A | 3/1997 | Mullins | | 6,172,613 B1 | 1/2001 | DeLine et al. |
| 5,619,370 A | 4/1997 | Guinosso | | 6,175,164 B1 | 1/2001 | O'Farrell et al. |
| 5,634,709 A | 6/1997 | Iwama | | 6,175,300 B1 | 1/2001 | Kendrick |
| 5,642,299 A | 6/1997 | Hardin et al. | | 6,198,409 B1 | 3/2001 | Schofield et al. |
| 5,648,835 A | 7/1997 | Uzawa | | 6,201,642 B1 | 3/2001 | Bos |
| 5,650,944 A | 7/1997 | Kise | | 6,222,447 B1 | 4/2001 | Schofield et al. |
| 5,660,454 A | 8/1997 | Mori et al. | | 6,222,460 B1 | 4/2001 | DeLine et al. |
| 5,661,303 A | 8/1997 | Teder | | 6,243,003 B1 | 6/2001 | DeLine et al. |
| 5,666,028 A | 9/1997 | Bechtel et al. | | 6,250,148 B1 | 6/2001 | Lynam |
| 5,668,663 A | 9/1997 | Varaprasad et al. | | 6,259,412 B1 | 7/2001 | Duroux |
| 5,670,935 A | 9/1997 | Schofield et al. | | 6,266,082 B1 | 7/2001 | Yonezawa et al. |
| 5,675,489 A | 10/1997 | Pomerleau | | 6,266,442 B1 | 7/2001 | Laumeyer et al. |
| 5,677,851 A | 10/1997 | Kingdon et al. | | 6,285,393 B1 | 9/2001 | Shimoura et al. |
| 5,699,044 A | 12/1997 | Van Lente et al. | | 6,291,906 B1 | 9/2001 | Marcus et al. |
| 5,703,568 A | 12/1997 | Hegyi | | 6,294,989 B1 | 9/2001 | Schofield et al. |
| 5,724,187 A | 3/1998 | Varaprasad et al. | | 6,297,781 B1 | 10/2001 | Turnbull et al. |
| 5,724,316 A | 3/1998 | Brunts | | 6,302,545 B1 | 10/2001 | Schofield et al. |
| 5,737,226 A | 4/1998 | Olson et al. | | 6,310,611 B1 | 10/2001 | Caldwell |
| 5,757,949 A | 5/1998 | Kinoshita et al. | | 6,313,454 B1 | 11/2001 | Bos et al. |
| 5,760,826 A | 6/1998 | Nayer | | 6,317,057 B1 | 11/2001 | Lee |
| 5,760,828 A | 6/1998 | Cortes | | 6,320,176 B1 | 11/2001 | Schofield et al. |
| 5,760,931 A | 6/1998 | Saburi et al. | | 6,320,282 B1 | 11/2001 | Caldwell |
| 5,760,962 A | 6/1998 | Schofield et al. | | 6,326,613 B1 | 12/2001 | Heslin et al. |
| 5,761,094 A | 6/1998 | Olson et al. | | 6,329,925 B1 | 12/2001 | Skiver et al. |
| 5,765,116 A | 6/1998 | Wilson-Jones et al. | | 6,333,759 B1 | 12/2001 | Mazzilli |
| 5,781,437 A | 7/1998 | Wiemer et al. | | 6,341,523 B1 | 1/2002 | Lynam |
| 5,786,772 A | 7/1998 | Schofield et al. | | 6,353,392 B1 | 3/2002 | Schofield et al. |
| 5,790,403 A | 8/1998 | Nakayama | | 6,366,213 B2 | 4/2002 | DeLine et al. |
| 5,790,973 A | 8/1998 | Blaker et al. | | 6,370,329 B1 | 4/2002 | Teuchert |
| 5,793,308 A | 8/1998 | Rosinski et al. | | 6,396,397 B1 | 5/2002 | Bos et al. |
| 5,793,420 A | 8/1998 | Schmidt | | 6,411,204 B1 | 6/2002 | Bloomfield et al. |
| 5,796,094 A | 8/1998 | Schofield et al. | | 6,411,328 B1 | 6/2002 | Franke et al. |
| 5,798,575 A | 8/1998 | O'Farrell et al. | | 6,420,975 B1 | 7/2002 | DeLine et al. |

| Patent | Date | Inventor |
|---|---|---|
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 * | 8/2002 | Guerra .................... 348/157 |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,625,587 B1 | 9/2003 | Erten et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,375,803 B1 * | 5/2008 | Bamji .................... 356/4.01 |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 * | 12/2009 | Dunsmoir et al. ............ 340/435 |
| 7,639,149 B2 | 12/2009 | Katoh |
| 7,676,087 B2 | 3/2010 | Dhua et al. |
| 7,720,580 B2 | 5/2010 | Higgins-Luthman |
| 7,881,496 B2 | 2/2011 | Camilleri |
| 7,914,187 B2 | 3/2011 | Higgins-Luthman et al. |
| 8,017,898 B2 | 9/2011 | Lu et al. |
| 8,224,031 B2 | 7/2012 | Saito |
| 8,237,794 B2 | 8/2012 | Moritz et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0219852 A1 | 10/2005 | Stam et al. |
| 2005/0232469 A1 | 10/2005 | Schofield et al. |
| 2005/0237385 A1 | 10/2005 | Kosaka et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0092244 A1 | 4/2007 | Pertsel et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2007/0201738 A1 * | 8/2007 | Toda et al. .................... 382/144 |
| 2007/0242339 A1 | 10/2007 | Bradley |
| 2008/0147321 A1 * | 6/2008 | Howard et al. ............... 701/211 |
| 2008/0180529 A1 | 7/2008 | Taylor et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |

| | | | |
|---|---|---|---|
| 2009/0190015 | A1 | 7/2009 | Bechtel et al. |
| 2009/0256938 | A1 | 10/2009 | Bechtel et al. |
| 2010/0045797 | A1 | 2/2010 | Schofield et al. |
| 2012/0045112 | A1* | 2/2012 | Lundblad et al. ............ 382/135 |

FOREIGN PATENT DOCUMENTS

| | | |
|---|---|---|
| DE | 4139515 | 6/1992 |
| DE | 4123641 | 1/1993 |
| EP | 0416222 | 3/1991 |
| EP | 0426503 | 5/1991 |
| EP | 0513476 | 11/1992 |
| FR | 2641237 | 7/1990 |
| FR | 2672857 | 8/1992 |
| FR | 2673499 | 9/1992 |
| FR | 2726144 | 4/1996 |
| GB | 2244187 | 11/1991 |
| GB | 2255539 | 11/1992 |
| GB | 2327823 | 2/1999 |
| JP | 59-114139 | 7/1984 |
| JP | 60-79889 | 10/1986 |
| JP | 62-72245 | 8/1987 |
| JP | 64-014700 | 1/1989 |
| JP | 01-123587 | 5/1989 |
| JP | 01-141137 | 6/1989 |
| JP | 03-061192 | 3/1991 |
| JP | 03-099952 | 4/1991 |
| JP | 03-284413 | 12/1991 |
| JP | 04-114587 | 4/1992 |
| JP | 04-245866 | 9/1992 |
| JP | 05-000638 | 1/1993 |
| JP | 05-050883 | 3/1993 |
| JP | 05-077657 | 3/1993 |
| JP | 05-213113 | 8/1993 |
| JP | 61-056638 | 6/1994 |
| JP | 62-027318 | 8/1994 |
| JP | 06-267304 | 9/1994 |
| JP | 06-276524 | 9/1994 |
| JP | 06-295601 | 10/1994 |
| JP | 07-004170 | 1/1995 |
| JP | 07-032936 | 2/1995 |
| JP | 07-047878 | 2/1995 |
| JP | 07-052706 | 2/1995 |
| JP | 07-069125 | 3/1995 |
| JP | 07-105496 | 4/1995 |
| JP | 08-166221 | 6/1996 |
| JP | 26-30604 | 7/1997 |
| JP | 2003-083742 | 3/2003 |
| WO | WO 8605147 | 9/1986 |
| WO | WO 9621581 | 7/1996 |
| WO | WO 9735743 | 10/1997 |
| WO | WO 9814974 | 4/1998 |

OTHER PUBLICATIONS

Article entitled On-Chip CMOS Sensors for VLSI Imaging Systems,: published by VLSI Vision Limited, 1991.

Bow, Sing T., "Pattern Recognition and Image Preprocessing (Signal Processing and Communications)", CRC Press, Jan. 15, 2002, pp. 557-559.

Dana H. Ballard and Christopher M. Brown, Computer Vision, Prentice-Hall, Englewood Cliffs, New Jersey, 5 pages, 1982.

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

G. Wang, D. Renshaw, P.B. Denyer and M. Lu, CMOS Video Cameras, article, 1991, 4 pages, University of Edinburgh, UK.

Hamit, Francis "360-Degree Interactivity: New Video and Still Cameras Provide a Global Roaming Viewpoint," Advanced Imaging, Mar. 1997, p. 50.

J. Borenstein et al., "Where am I? Sensors and Method for Mobile Robot Positioning", University of Michigan, Apr. 1996, pp. 2, 125-128.

Johannas, Laura "A New Microchip Ushers in Cheaper Digital Cameras," The Wall Street Journal, Aug. 21, 1998, p. B1.

Pratt, "Digital Image Processing, Passage—ED.3", John Wiley & Sons, US, Jan. 1, 2001, pp. 657-659, XP002529771.

Reexamination Control No. 90/007,519, Reexamination of U.S. Patent No. 6,222,447, issued to Schofield et al.

Reexamination Control No. 90/007,520, Reexamination of U.S. Patent No. 5,949,331, issued to Schofield et al.

Reexamination Control No. 90/011,477, Reexamination of U.S. Patent No. 5,949,331, issued to Schofield et al.

Reexamination Control No. 90/011,478, Reexamination of U.S. Patent No. 6,222,447, issued to Schofield et al.

Tokimaru et al., "CMOS Rear-View TV System with CCD Camera", National Technical Report vol. 34, No. 3, pp. 329-336, Jun. 1988 (Japan).

Van Leeuwen et al., "Motion Estimation in Image Sequences for Traffic Applications", vol. 1, May 1, 2000, pp. 354-359, XP002529773.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Requirements for Motion Estimation in Image Sequences for Traffic Applications", IEEE, US, vol. 1, May 24, 1999, pp. 145-150, XP010340272.

Van Leuven et al., "Real-Time Vehicle Tracking in Image Sequences", IEEE, US, vol. 3, May 21, 2001, pp. 2049-2054, XP010547308.

Vlacic et al., (Eds), "Intelligent Vehicle Tecnologies, Theory and Applications", Society of Automotive Engineers Inc., edited by SAE International, 2001.

* cited by examiner

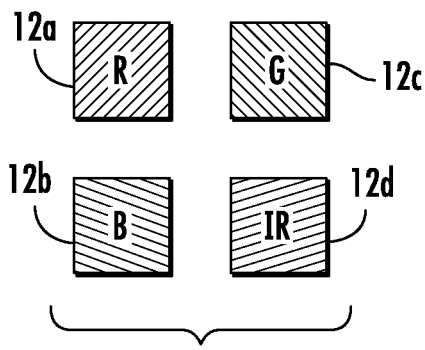
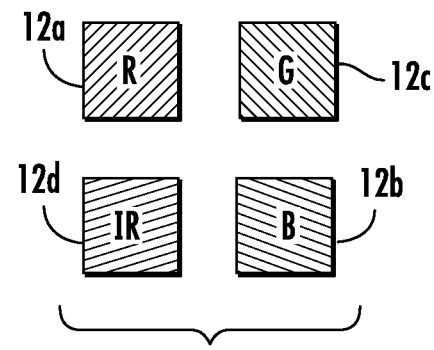
FIG. 3A    FIG. 3B
FIG. 4

COMBINED RGB AND IR IMAGING SENSOR

CROSS REFERENCE TO RELATED APPLICATION

The present application claims the benefit of U.S. provisional application Ser. No. 60/977,430, filed Oct. 4, 2007, which is hereby incorporated herein by reference in its entirety.

FIELD OF THE INVENTION

The present invention relates to vision systems for vehicles and, more particularly, to an imaging sensor or camera for a vision or imaging system of a vehicle.

BACKGROUND OF THE INVENTION

Traditional color imagers or image sensors or pixelated imaging arrays use a Bayer pattern of pixels and pixel filters, which has a red-green-green-blue (R-G-G-B) pixel/filter configuration (such as shown in FIG. 1). In such a pixelated array, the sensor includes individual optical filters that transmit red, green or blue colors and that are disposed at or coated on the individual pixels. Thus, there is a "red pixel" 12a, a "blue pixel" 12b and two "green pixels" 12c arranged to form a 2×2 sub-array 10 that is repeated over the pixelated array.

The three color filters (R, G, and B) not only pass ranges of wavelengths or spectral bands that are corresponding to red, green and blue colors, they also pass through a significant amount of wavelengths in the infrared (IR) or near infrared (NIR) region or band of the spectrum. Therefore, the color imager sensitivity or quantum efficiency spectrum typically has a rich IR or NIR response even with the R, G, and B color pixels. For example, a typical silicon CMOS color sensor's spectrum response is shown in FIG. 2. The IR response of the R, G and B pixels is comparable or higher than the pixels' response of visible spectrum. The IR light from the environment thus may wash-out the color response in the visible spectrum and thus may distort the image color reproduction. This is often referred to as IR contamination. In a traditional color camera, in order to reproduce a true color image, an IR cut-off filter is usually used to cut off or reduce light or energy at or in the IR band or region of the spectrum so as to allow only (or substantially only) the visible light to pass through the filter so as to be imaged by the RGGB pixels, in order to reduce or limit or substantially eliminate the IR contamination. Such an IR cut-off filter is typically made of multilayer coatings on a glass or plastic element, such as a flat glass plate, that is added on to a lens assembly of the imager or onto a surface of a lens element of the lens assembly of the imager. The coating process and added material increase the cost of the lens, sometimes significantly.

On the other hand, for IR imaging applications that have the main spectrum of interest in the NIR region of the spectrum, where silicon CCD or CMOS can provide good quantum efficiency, one may need to cut the visible spectrum off from the light reaching the imager. A long pass filter that is a multilayer coating on a glass or plastic flat plate is typically used to let through NIR light only. Security cameras and some special industrial machine vision systems are among the applications of such a filter-imager configuration. For cameras that operate in both day and night for such applications, mechanical switches of IR cutoff filters and IR pass filters are used on silicon CMOS or CCD cameras. The additional cost of two filters and mechanical switches, as well as the reliability of the moving mechanical switch, make such systems undesirable, and such a design is not suitable for automotive or consumer digital cameras or cell phone cameras.

SUMMARY OF THE INVENTION

The present invention provides an imaging sensor or camera having a pixel configuration that combines red (R), green (G), and blue (B) sensing pixels with an infrared (IR) sensing pixel. The present invention provides de-mosaicing techniques for processing the R-G-B-IR imager pixels. The imaging sensor or camera of the present invention is suitable for use in automotive camera products, such as for vision-based systems, such as headlamp control systems, reverse aid systems, lane departure warning systems, object detection systems, rain sensor systems, front collision warning, night vision and/or the like. The imaging sensor or camera of the present invention may also be suitable for use in security cameras, consumer digital cameras, cell phone cameras and industrial machine vision systems and/or the like.

Therefore, the imaging sensor of the present invention can provide both visible and IR imaging capability without external filters and shuttering/switching mechanism. Such a pixel configuration of R-G-B-IR pixels is applicable to various pixelated imaging array type sensors, such as CMOS, CCD and/or other image sensing devices. The imaging sensor of the present invention is suitable for applications in security cameras, automotive cameras, consumer digital cameras, cell phone cameras, and industrial machine vision cameras, as well as other markets and/or applications.

These and other objects, advantages, purposes and features of the present invention will become more apparent upon review of the following specification in conjunction with the drawings.

BRIEF DESCRIPTION OF THE DRAWINGS

FIGS. 3A and 3B are schematics of R-G-B-IR pixel patterns in accordance with the present invention;

FIG. 4 is a schematic of an array having a R-G-B-IR pixel pattern in accordance with the present invention;

DESCRIPTION OF THE PREFERRED EMBODIMENTS

Imaging Sensor Description

Figure 1:
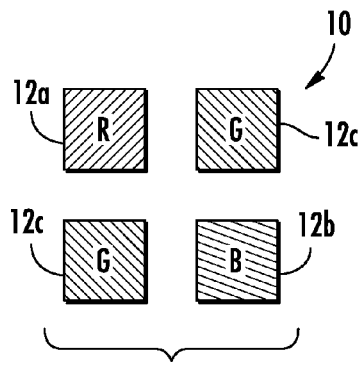
FIG. 1 is a schematic of a typical R-G-G-B pattern or Bayer pattern.

The imaging sensor of the present invention comprises a two-dimensional pixelated imaging array having a plurality of photo-sensing pixels arranged or disposed or established on a semiconductor substrate. For example, the imaging sensor may comprise a complementary-metal-oxide-semiconductor (CMOS) or a CCD imaging sensor or device or the like, and may utilize aspects of the imaging sensors described in U.S. Pat. Nos. 5,796,094; 6,097,023; 6,320,176; 6,313,454; 6,559,435; 6,831,261; 6,396,397; 5,877,897; 6,498,620; 5,670,935; 6,806,452; 6,946,978; 7,123,168; 7,004,606; 7,005,974; and/or 5,550,677, and/or PCT Application No. PCT/US07/75702, filed Aug. 10, 2007, and/or U.S. patent application Ser. No. 11/239,980, filed Sep. 30, 2005; Ser. No. 11/105,757, filed Apr. 14, 2005 by Schofield et al. for IMAGING SYSTEM FOR VEHICLE; and/or Ser. No. 10/534,632, filed May 11, 2005; and/or PCT Application No. PCT/US2003/036177, filed Nov. 14, 2003 by Donnelly Corp. for IMAGING SYSTEM FOR VEHICLE; and/or PCT Application No. PCT/US2006/041709, filed Oct. 27, 2006 and published May 10, 2007 as International Publication No. WO 07/053404, which are hereby incorporated herein by reference in their entireties.

The arrangement of pixels has a pixel pattern that is derived from the Bayer pattern, but has one of the green filters or pixels replaced by an infrared (IR) filter or pixel 12d, such as shown in FIGS. 3A and 3B. The IR filter or pixel has an optical filter that limits or reduces or substantially precludes light or electromagnetic energy in the visible band or region of the spectrum so as to pass or substantially pass IR energy (for example, energy having a wavelength at or above about 700 nm or thereabouts) so that the pixel principally senses IR energy or NIR energy. The red, green and blue pixels may have a similar filter as implemented for typical Bayer pattern imaging sensors (and thus principally sense the respective visible color band of the spectrum), while the IR pixel has a filter that cuts off light in the visible spectrum and passes only light in the NIR or IR band or region of the spectrum. Optionally, for example, the IR filter may comprise a red filter and a blue filter stacked one on top of the other to form a NIR or IR pass filter. The system may function to process an output of the NIR or IR pixel to determine an infrared component of the imaged scene and may subtract the infrared component from the outputs of the red, green and blue pixels to obtain a more accurate or true color response for the pixels and to limit or avoid infrared color wash-out, as discussed below.

Optionally, the R-G-B-IR filter arrangement may be any suitable arrangement of pixels/filters in a repeating pattern, such as the 2×2 arrangements of pixels shown in FIGS. 3A and 3B. As shown in FIG. 3A, a 2×2 pixel matrix or sub-array may have the IR pixel 12d positioned diagonal to the red pixel 12a. Since the red pixel has a stronger NIR response than the green pixel 12c and the blue pixel 12b, such an arrangement will generate a more evenly distributed IR image by placing the IR pixel and the red pixel diagonally. Such an arrangement will also benefit the IR image resolution in the de-mosaicing methods described below. Alternately, and as shown in FIG. 3B, the pixel arrangement may have a repeating 2×2 matrix or sub-array with the green and blue pixels 12c, 12h along one column and the red and IR pixels 12a, 12d along the other column, such that half of the columns (green and blue pixels only) has a weaker IR sensitivity, while the other half of the columns has a greater IR sensitivity. The benefit of such an arrangement is the direct replacement (as compared to a typically R-G-G-B pixel arrangement) of a green pixel by an IR pixel (because a typically R-G-G-B pixel arrangement would have the IR pixel replaced with a green pixel), which results in smaller imager fabrication process change. In the de-mosaicing technique discussions below, the de-mosaicing techniques are described in relation to the pixel arrangement of FIG. 3A, but it is envisioned that similar de-mosaicing techniques may be carried out with the pixel arrangement of FIG. 3B, while remaining within the spirit and scope of the present invention.

Since the red, green and blue pixels typically may have a similar IR response as the IR pixel, the establishment of the IR pixel on each sub-array of the pixelated array allows for a determination of the IR component present in the light being imaged. Thus, the IR component (the IR or NIR energy or light sensed by the IR pixel) can be subtracted from the red, green and blue pixel response signal to obtain a more accurate or true color response for the pixels and to limit or avoid IR color wash-out. Further, with the IR cut-off in the sensor pixel level, there is no need to add IR cut-off filter in a lens. This simplifies the lens design and results in significant cost savings in manufacturing of the optical lens for the imager. Because the sensitivities in the IR region of the red, green and blue pixels may be different, factors or ratios may be applied to the IR signal when subtracting the IR value or component from the color signals. For example, the color values of the pixel signals may be determined via the following equations:

Red Color Value=Red Pixel Value$-A_R$*IR Pixel Value;

Green Color Value=Green Pixel Value$-A_G$*IR Pixel Value;

Blue Color Value=Blue Pixel Value$-A_B$*IR Pixel Value; and

IR Value=IR Pixel Value, where $A_R$, $A_G$, and $A_B$ are the selected factors for the red pixels, green pixels and blue pixels, respectively.

Figure 2:
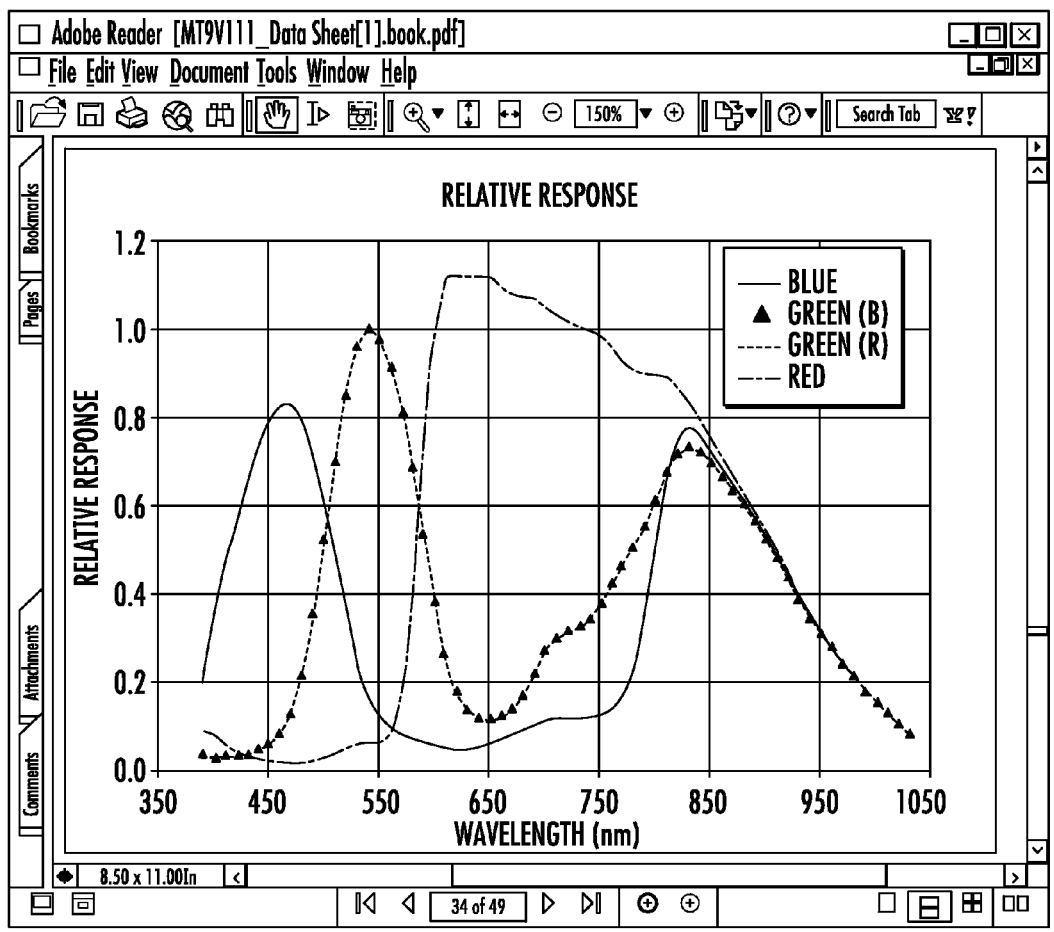
FIG. 2 is a schematic of a silicon CMOS color sensor's spectrum response.

Optionally, for example, these factors can be selected to be 1 to simplify the de-mosaicing circuitry or software. However, the spectral responses of the R, G and B pixels in the NIR region may not match well with that of the IR pixel. As a result, it may be difficult to totally cancel out the IR signal from the R, G and B pixels that sensing light in the visible range of the spectrum. Optionally, the factors of each R, G and B color can be determined by the corresponding spectral sensitivities of the sensor. The spectrum contribution of the light source should also be considered. For example, for applications where the scene is illuminated by a light source or light sources emitting illumination within a known spectral band or region of the spectrum, a combination of the light source and the imager's spectral sensitivity may determine the factors. For example, if an imaged object or illumination source contains narrow-band IR illumination around 750 nm, the imager with spectral characteristics such as shown in FIG. 2 should have different green and blue factor values. As another example, when an incandescent light source or a Halogen light source is used, because of their light output being in a more wide spread spectrum in both visible and IR ranges, there should be another set of factors for the red, green and blue pixels. Because of the known source spectrum in such cases, the factors can be pre-determined. Also, if an application involves multiple controlled illumination spectra sources (with at least one of the illumination sources generating a light output having different spectral characteristics than at least one other of the illumination sources), the factors corresponding to each illumination source can be stored in the memory of the imager or camera or processor and loaded to the imager or the processor for calibration when the illumination source changes to a different illumination source generating a light output having a different spectral characteristic.

Optionally, for illumination sources that generate a light or energy output with changing or un-controlled spectrum or spectral characteristics, such as sun light at different times of the day, more sophistical image processing can be applied to determine the factors. For example, an iterative approach can be used in which multiple passes with different factors determine the best factors. As another example, a color conversion matrix can be used in a manner that is similar to an auto white balance technique that is commonly used in visible light cameras, wherein a statistical analysis of the scene image is performed to determine the contribution of individual visible colors and the IR spectrum and to determine the values of three factors.

With the pixel arrangements discussed above and the de-mosaicing techniques described below, an imager or imaging system of the present invention can produce a visible color image and a NIR image at the same time. The following sections describe the different de-mosaicing techniques of the present invention.

De-Mosaicing Techniques

A pixelated imaging array of the present invention may have an R-G-B-IR pixel pattern, such as described above and shown in FIG. 3A. Although shown in FIGS. 4-7 as a 4×4 array of pixels, clearly the imaging array may have and preferably has an array of at least about 40×40 pixels and may have an array of, for example, about 512×512 pixels or 640×480 pixels or thereabouts or any other suitable array for capturing images in the field of view of the imaging sensor. In the illustrated embodiments, the 4×4 pixel sub-arrays are described below with the individual pixels at respective coordinates corresponding to the row and column location of the pixels (for example, the R1 red pixel is at location r0,c0, while the G3 green pixel is at location r2,c1, and so on). The de-mosaicing techniques of the present invention are applicable to any sized pixelated array and repeat the process over the entire array to de-mosaicize the pixelated array. The following de-mosaicing formulas describe different methods of extracting red, green, blue and IR values for each pixel from itself and the adjacent pixels. Thus, a visible color image and a NIR image can be produced at the same time via the processing techniques of the present invention.

2×2 Window De-Mosaicing

Figure 5:
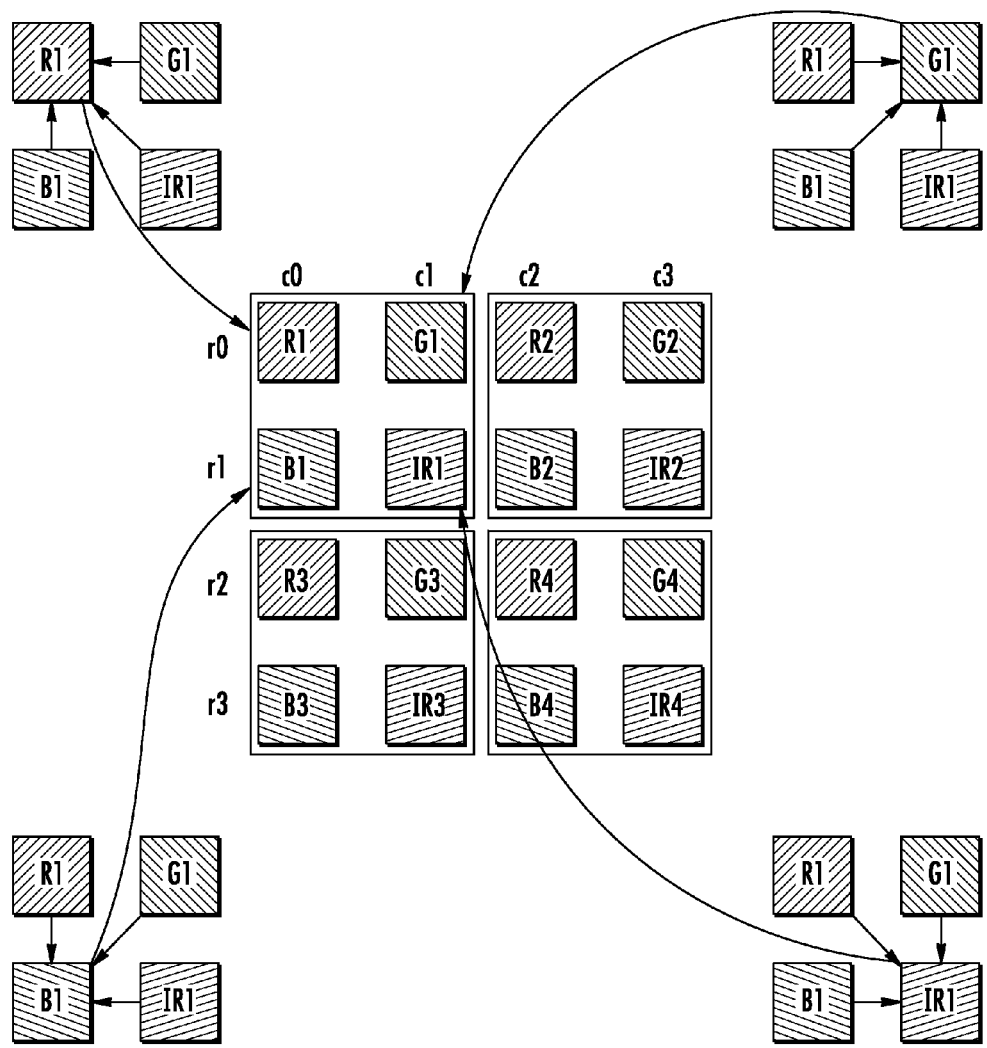
FIG. 5 is a schematic of a 2×2 window de-mosaicing method in accordance with the present invention.

For an R-G-B-IR pixel pattern, each pixel of the array has its associated primary color (or is sensitive to a particular band of the spectrum and is less sensitive to other bands of the spectrum), which comes from its filter type. For example, and with reference to FIG. 5, the R1 red pixel at r0c0 has a primary color of red, so that the red value for this pixel is readily available, while the G1 green pixel at r0,c1 has a primary color of green, so that the green value for this pixel is readily available, and the B1 blue pixel at r1,c0 has a primary color of blue so that the blue value for this pixel is readily available. The green, blue and IR values for this pixel location are calculated from the adjacent pixels in a 2×2 window. Each window covers four pixels in two rows and two columns and in order of red, green, blue and IR, such as shown in FIG. 5. The 2×2 window does not overlap any adjacent 2×2 windows. As an example in the first 2×2 window, the formulas for calculating the color or IR values for the pixel locations are as follows:

$R(r0c0)=R1-A_R*IR1, G(r0c0)=G1-A_G*IR1, B(r0c0)=B1-A_B*IR1$, and $IR(r0c0)=IR1$;

$R(r0c1)=R1-A_R*IR1, G(r0c1)=G1-A_G*IR1, B(r0c1)=B1-A_B*IR1$, and $IR(r0c1)=IR1$;

$R(r1c0)=R1-A_R*IR1, G(r1c0)=G1-A_G*IR1, B(r1c0)=B1-A_B*IR1$, and $IR(r1c0)=IR1$;

and $R(r1c1)=R1-A_R*IR1, G(r1c1)=G1-A_G*IR1, B(r1c1)=B1-A_B*IR1$, and $IR(r1c1)=IR1$, where $A_R$, $A_G$, and $A_B$ are the selected factors for the red pixels, green pixels and blue pixels, respectively, and where R(rx,cx) is the red color value for the respective pixel location, G(rx,cx) is the green color value for the respective pixel location, B(rx,cx) is the blue color value for the respective pixel location, and IR(rx,cx) is the infrared value for the respective pixel location, and where R1 is an output value of the red pixel of the window or sub-array, G1 is an output value of the green pixel of the window or sub-array, B1 is an output value of the blue pixel of the window or sub-array, and IR1 is an output value of the IR pixel of the window or sub-array.

Thus, the value of the IR component for that pixel location (as determined by multiplying the value of the IR pixel by a factoring value for each color) is subtracted from the value of the respective color pixel (and the color for the adjacent pixels also has the factored IR value subtracted therefrom) to determine the color value of each pixel location. This is repeated for each 2×2 window of the array.

2×2 Rolling Window De-Mosaicing

Figure 6:
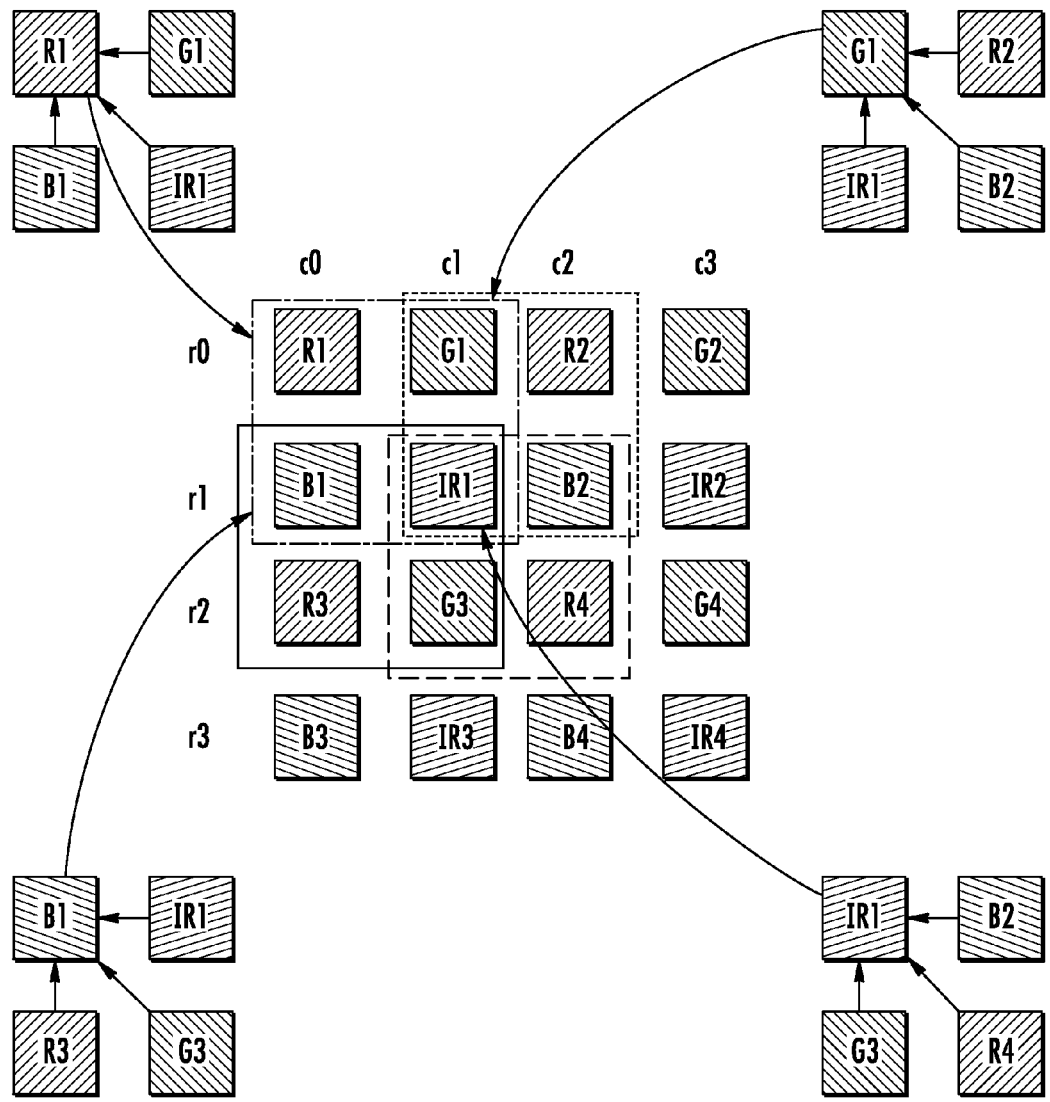
FIG. 6 is a schematic of a 2×2 rolling window de-mosaicing method in accordance with the present invention.
Figure 7:
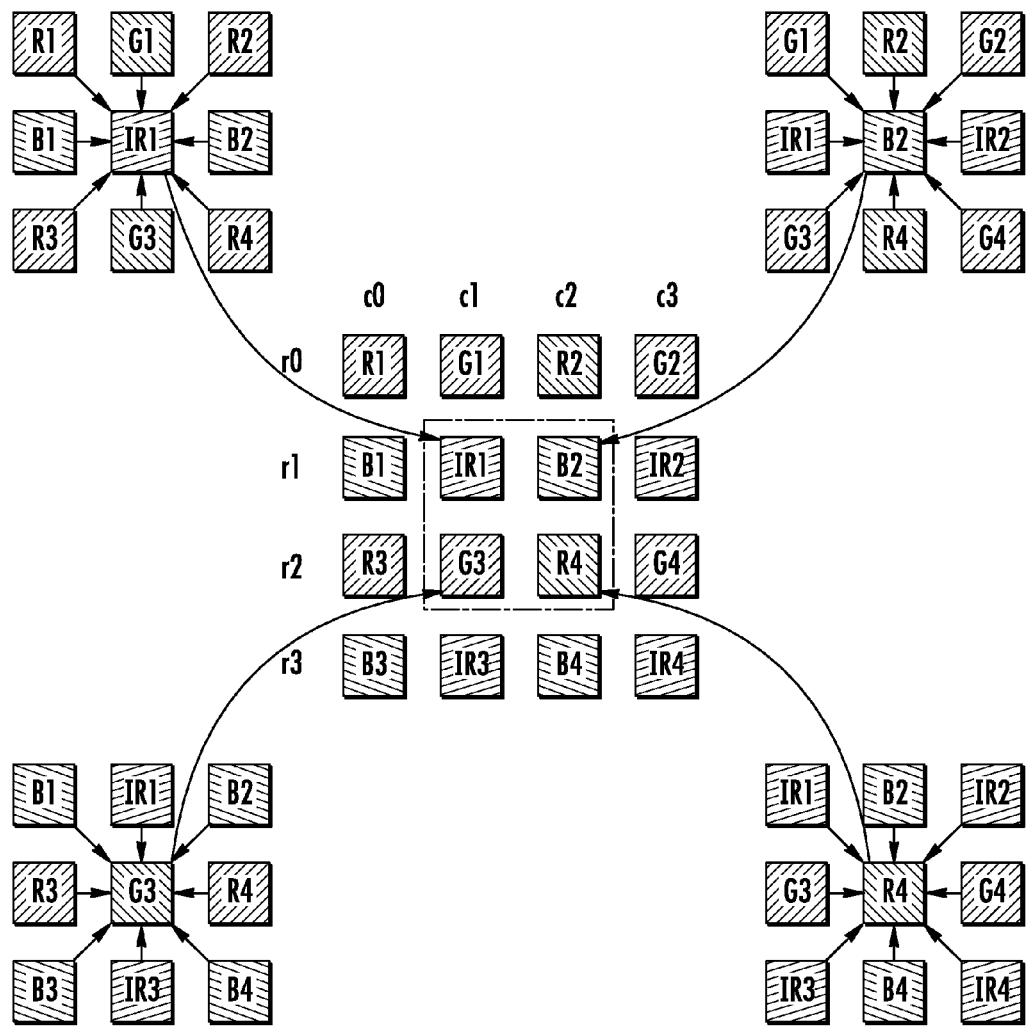
FIG. 7 is a schematic of a 3×3 rolling window de-mosaicing method in accordance with the present invention.

Unlike the 2×2 Window De-mosaicing method above, the 2×2 Rolling Window De-mosaicing process shifts the 2×2 window by one pixel at a time in both the row and column directions, such as can be seen with reference to FIG. 6. The following formulas show an example of de-mosaicing four pixels of each color band or IR band:

$R(r0c0)=R1-A_R*IR1, G(r0c0)=G1-A_G*IR1, B(r0c0)=B1-A_B*IR1$, and $IR(r0c0)=IR1$;

$R(r0c1)=R2-A_R*IR1, G(r0c1)=G1-A_G*IR1, B(r0c1)=B2-A_B*IR1$, and $IR(r0c1)=IR1$;

$R(r1c0)=R3-A_R*IR1, G(r1c0)=G3-A_G*IR1, B(r1c0)=B1-A_B*IR1$, and $IR(r1c0)=IR1$;

and $R(r1c1)=R4-A_R*IR1, G(r1c1)=G3-A_G*IR1, B(r1c1)=B2-A_B*IR1$, and $IR(r1c1)=IR1$, where $A_R$, $A_G$, and $A_B$ are the selected factors for the red pixels, green pixels and blue pixels, respectively, and where R(rx,cx) is the red color value for the respective pixel location, G(rx,cx) is the green color value for the respective pixel location, B(rx,cx) is the blue color value for the respective pixel location, and IR(rx,cx) is the infrared value for the respective pixel location, and where Rx is an output value of the red pixel of a respective sub-array, Gx is an output value of the green pixel of a respective sub-array, Bx is an output value of the blue pixel of a respective sub-array and IRx is an output value of the IR pixel of a respective sub-array.

Thus, the color values for the individual pixel locations are based on the color values for the respective color pixel within the particular 2×2 window, as reduced by the factored IR value of the IR pixel within the particular 2×2 window. The 2×2 window moves or shifts along the rows and columns during the processing of the pixelated array.

3×3 Rolling Window De-Mosaicing

Optionally, the imaging array may be de-mosaiced via a 3×3 rolling window de-mosaicing technique. In this method, each pixel will have its red, green, blue and IR information from averaging the adjacent pixels except for the primary color itself, such as can be seen with reference to FIG. 7. For example, the formulas for the pixel values at the pixel locations r1c1, r1c2, r2c1 and r2c2 are:

$$R(r1c1)=(R1+R2+R3+R4)/4-A_R*IR1, G(r1c1)=(G1+G3)/2-A_G*IR1, B(r1c1)=(B1+B2)/2-A_B*IR1, \text{ and } IR(r0c0)=IR1;$$

$$R(r1c2)=(R2+R4)/2-A_R*(IR1+IR2)/2, G(r1c2)=(G1+G2+G3+G4)/4-A_G*(IR1+IR2)/2, B(r0c1)=B2-A_B*(IR1+IR2)/2, \text{ and } IR(r0c1)=(IR1+IR2)/2;$$

$$R(r2c1)=(R3+R4)/2-A_R*(IR1+IR3)/2, G(r2c1)=G3-A_G*(IR1+IR3)/2, B(r2c1)=(B1+B2+B3+B4)/4-A_B*(IR1+IR3)/2, \text{ and } IR(r2c1)=(IR1+IR3)/2; \text{ and }$$

$$R(r2c2)=R4-A_R*(IR1+IR2+IR3+IR4)/4, G(r1c1)=(G3+G4)/2-A_G*(IR1+IR2+IR3+IR4)/4, B(r2c2)=(B2+B4)/2-A_B*(IR1+IR2+IR3+IR4)/4, \text{ and } IR(r2c2)=(IR1+IR2+IR3+IR4)/4,$$

where $A_R$, $A_G$, and $A_B$ are the selected factors for the red pixels, green pixels and blue pixels, respectively, and where R(rx,cx) is the red color value for the respective pixel location, G(rx,cx) is the green color value for the respective pixel location, B(rx,cx) is the blue color value for the respective pixel location, and IR(rx,cx) is the infrared value for the respective pixel location, and where Rx is an output value of the red pixel of a respective sub-array, Gx is an output value of the green pixel of a respective sub-array, Bx is an output value of the blue pixel of a respective sub-array and IRx is an output value of the IR pixel of a respective sub-array.

Thus, the values for each color component of each row/column location is determined by averaging the respective colored pixels that are adjacent to the particular pixel location or coordinate. For example, the red color component for the pixel location r1,c1 is the average of the four red pixels R1, R2, R3, R4 (at r0,c0; r0,c2; r2,c0; and r2,c2) that are adjacent to the pixel location r1,c1, while the green color component for the pixel location r1,c1 is the average of the two green pixels G1, G3 (at r0,c1 and r2,c1) that are adjacent to the pixel location r1,c1, and the blue color component for the pixel location r1,c1 is the average of the two blue pixels B1, B2 (at r1,c0 and r1,c2) that are adjacent to the pixel location r1,c1. For the infrared value at the pixel location r1,c1, the infrared value is determined by the value of the IR1 pixel at that particular location. The color or IR values for the other coordinates or pixel locations are determined in a similar manner.

Implementation Methods

It is envisioned that any of the above de-mosaicing techniques may be implemented in conjunction with any suitable imaging array sensor. For example, the above de-mosaicing techniques can be implemented on or in conjunction with an imager chip, which is often called a system-on-chip (SOC). Optionally, such processing techniques may be implemented outside the imager chip by means of a FPGA, DSP or microprocessor or the like, while remaining within the spirit and scope of the present invention.

Applications

IHC Reflective Object Identification

In Intelligent Headlamp Control (IHC) applications, spectral information, such as R, G, B color information may be used to assist identifying tail lights, head lamps and traffic signs, such as described in U.S. Pat. Nos. 5,796,094; 6,097,023; 6,320,176; 6,313,454; 6,559,435; 6,831,261; 6,396,397; 5,877,897; 6,498,620; 5,670,935; 6,946,978; 7,123,168; 7,004,606; 7,005,974; and/or 5,550,677, and/or PCT Application No. PCT/US07/75702, filed Aug. 10, 2007, and/or U.S. patent application Ser. No. 11/239,980, filed Sep. 30, 2005; and/or Ser. No. 10/534,632, filed May 11, 2005; and/or PCT Application No. PCT/US2003/036177, filed Nov. 14, 2003 by Donnelly Corp. for IMAGING SYSTEM FOR VEHICLE, which are hereby incorporated herein by reference in their entireties. It is usually challenging to identify and separate reflective objects, like traffic signs in night scene, from tail lights, head lamps and street lights. The techniques that have been often used are identifying color (traffic signs are often yellow or white) and shapes (traffic signs are often square or rectangle). However, these techniques are not always effective and accurate.

The present invention provides a processing technique that uses IR information to increase the identification accuracy. In addition to three visible colors, IR adds one more dimension to the color space. All tail lights, head lamps and traffic signs have their IR signatures based on how much they emit or reflect IR light. For instance, a traffic sign reflects the light from the head lamps of an approaching vehicle, with the head lamp illumination carrying a known IR signature. Quantitative IR signature of objects helps to determine the types of objects, such as for example, whether an object is a light or a road side traffic sign or other object. The IR signatures include:

1. Ratios of IR to R signals of object types, IR to G signals of object types, and IR to B signals of object types.
2. An extension to the 2-D CIE color space to form a 3-D space. The location of an object type (such as a stop sign or the like) in the 3-D space is a signature that identifies the object type.
3. R, G, B, IR 4-D coordinate space. The location of an object type in the 4-D coordinate space is a signature that identifies the object type.

In the signatures of the types 2 and 3 above, the vision algorithm can calibrate and define an area, range or segment of these color spaces to classify the object types located inside these regions. Thus, the system may recognize or identify an object based on whether the signature of the detected object falls within a particular signature range that is previously categorized or identified as being associated with or indicative of or representative of a particular object or type or class of object.

The system thus may utilize the CIE color space, as is known in the color art, such as by utilizing aspects of the systems described in U.S. patent application Ser. No. 11/239,980, filed Sep. 30, 2005, which is hereby incorporated herein by reference in its entirety. The Centre Internationale dEclairage (CIE) is an international organization that establishes methods for measuring color and that recommends standards and procedures for light and lighting, including colorimetry. The color standards for colormetric measurements are internationally accepted specifications that define color values mathematically. CIE defines color as a combination of three axes: x, y, and z. CIE color models are considered device independent because the colors should not differ, theoretically, from one output device to another if properly calibrated.

In addition to the spectral domain, one can apply IR processing techniques to identify an object in the time domain. For example, a vehicle can include an IR light source, such as an IR LED or the like, at or near or in the headlamp assembly. The headlamp's IR output can be modulated with a pulse width modulation (PWM) sequence. Since only traffic signs, not the head lamps of other oncoming vehicles or tail lights of other leading vehicles reflect the IR light, the traffic signs appear in the image frames that the headlamp IR source is turned on, and is diminished or reduced in the image frames that the headlamp IR source is turned off. For the objects seen in the IR image that possibly come from oncoming vehicle headlamps, proceeding vehicle tail lights or street lights, the captured images of these objects or illumination sources will not have such an on and off sequence, which is synchronized with the IR light source PWM sequence. Such a processing technique can also help identify and separate the reflective objects in the forward field of view of the imager, such as retro-reflective marks/signs that are placed on the mailbox, front yard, building side or reflective stripes on trucks. The modulated IR light is not visible or discernible to humans, so it does not impede drivers of other vehicles or the driver of the subject or host vehicle and does not violate related regulations. The PWM sequence of each vehicle can be encoded or controlled with unique "signature" to avoid the interference from other vehicles equipped with the same type of PWM IR lights. Optionally, for example, this signature can be one of the following or a combination of the following: (1) unique modulation sequence, (2) unique modulation frequency.

NIR Night Vision Capability in Forward Viewing Camera

Figure 8:
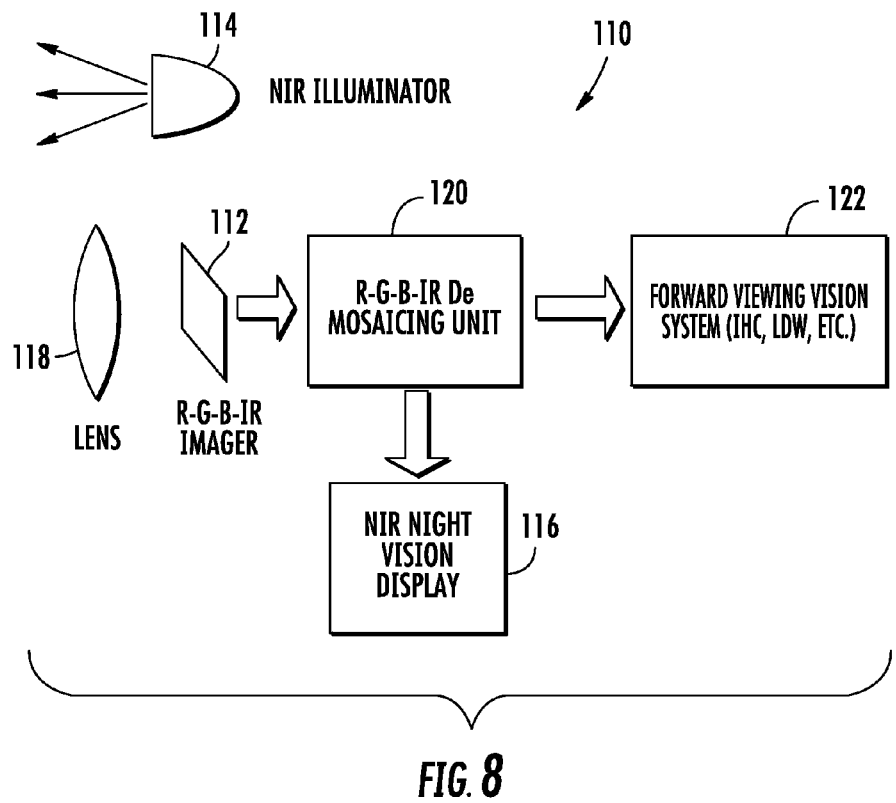
FIG. 8 is a schematic of a camera system combining forward viewing vision and NIR night vision display in accordance with the present invention.

A NIR night vision system of the present invention may include a NIR light source (such as a LED, laser, or other NIR light sources) that illuminates the scene in the dark environment, a NIR video camera that captures image/video of the scene, and a display that shows the captured NIR images to a driver. For example, and with reference to FIG. 8, a vision system 110 includes an R-G-B-IR imager or imaging device or camera 112, a NIR illuminator or illumination source 114 (such as a NIR LED or the like) and a display device 116. The imager may include or may be associated with a lens or optic 118 for focusing the scene onto an imaging plane of the imager. The system 110 includes an R-G-B-IR de-mosaicing processor or algorithm 120 or the like, which provides or generates an output, such as for displaying images at the display device 116 or for further processing by an associated forward viewing vision system 122 (which may be part of or associated with the de-mosaicing processor or a separate processor or the like), such as a headlamp control system or a lane departure warning system or the like.

The NIR night vision system allows a driver to see a farther distance ahead of the vehicle and to see and discern more objects than he or she can normally see with typical head lamp illumination. Such a vision system thus gives the driver more time to react to different driving conditions. It is desirable to have a NIR camera mounted inside the vehicle compartment and looking forward. To avoid blocking the viewing angle of driver, it is best to mount the camera behind the rear view mirror, and preferably with a forward field of view through the windshield of the vehicle and through an area that is wiped or cleaned by the windshield wipers of the vehicle. The NIR illumination source can be either mounted inside one or both headlamps or inside the driver compartment, such as at or in or near or behind the interior rear view mirror or accessory module or windshield electronics module or the like.

The forward viewing camera thus may be mounted behind the rear view mirror and inside the vehicle, and the system may provide driver assistance and safety functions, such as intelligent headlamp control, lane departure warning, traffic sign recognition, adaptive cruise control, and/or the like. Optionally, the forward viewing camera may provide or be associated with a rain sensing function, or there may be other sensing devices, such as a rain sensor or the like, mounted at or near or behind the rear view mirror. Adding a NIR camera to an already crowded space behind the rear view mirror can be challenging and costly. It is thus desirable to combine the NIR camera to a visible forward viewing camera to save space and cost. The R-G-B-IR imager of the present invention provides a solution to combine the visible forward viewing camera and the NIR camera into a single imager and camera body.

Rear Viewing Camera with NIR Night Vision

A typical automotive rear viewing camera includes a color imager and a lens with IR cut-off filter. The IR cut-off filter in the lens prevents the camera from IR contamination and provides good visible color images for the camera in normal lighting conditions. However, in a night condition when no or minimum ambient light is available to illuminate the scene behind the vehicle, the only illumination comes from the vehicle tail lights. The tail lights, which include running lights, brake lights and back up lights, typically produce illumination of less than a few Lux. Thus, in a rear viewing camera image with an IR cut-off filter, the night scene image is mostly noisy, dark and low-contrast. One can thus only view a very short distance behind the vehicle. This is partially because the IR cut-off filter cuts off a significant amount of the existing IR light in the tail light illumination which otherwise assists the imaging sensitivity.

To provide enhanced safety and enhanced convenience to the drivers, it is desirable to increase the low light sensitivity of the rear viewing camera. It may be desirable to take off the IR cutoff filter from the lens, so that the scene illuminated by the near IR light component from the tail lights, street light, garage light, and/or the like can be better imaged by the imager, since incandescent light bulbs, which are typically used in vehicle tail lights, street lights, garage lights, and the like, emit a relatively high amount of near IR light. It may also be desired to include an additional invisible near IR light source (such as, for example, a near infrared LED or the like) at or near or in the tail light assembly for illuminating the rearward scene of the vehicle. The high sensitivity of silicon imager in the near IR region helps increase the image sensitivity of the night scene.

Figure 9:
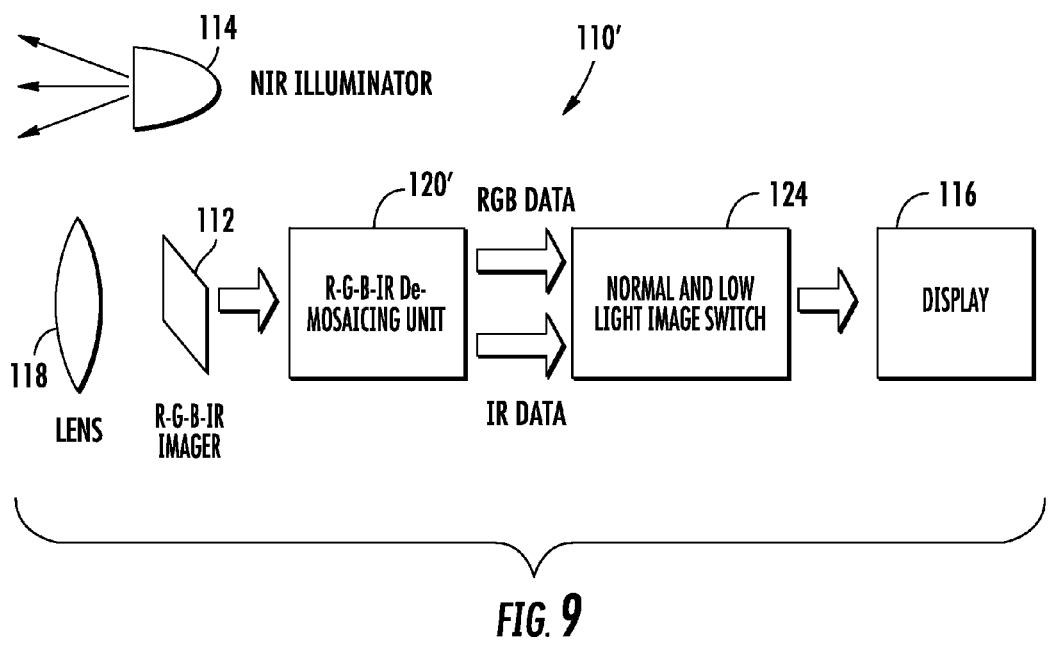
FIG. 9 is a schematic of a rear viewing camera system with enhanced low light sensitivity, hardware switches normal color image and low light NIR imaging in accordance with the present invention.

The R-G-B-IR imager described above provides a possibility of using NIR to enhance low light sensitivity of rear viewing cameras. A rear viewing camera, such as shown in FIG. 9, can provide good color images in normal lighting condition and enhanced low light sensitivity in low light or nighttime conditions. In a low light night scene, it is of less importance to produce true color images (because human eyes do not distinguish color as well under low illumination conditions) so a black-and-white image is sufficient for the night scene display. A hardware switch can be used to switch the video signal that feeds the display between the normal lighting color image and low light NIR image, such as by utilizing aspects of the imaging systems described in U.S. Pat. No. 6,498,620; and/or U.S. patent application Ser. No. 11/239,980, filed Sep. 30, 2005; and/or Ser. No. 10/534,632, filed May 11, 2005; and/or PCT Application No. PCT/US2003/036177, filed Nov. 14, 2003 by Donnelly Corp. for IMAGING SYSTEM FOR VEHICLE, which are hereby incorporated herein by reference in their entireties.

For example, and with reference to FIG. 9, a NIR night vision system 110' of the present invention may include an R-G-B-IR imager or imaging device or camera 112 and associated lens or optic 118, a NIR illuminator or illumination source 114 (such as a NIR LED or the like) and a display device 116. The system 110' includes an R-G-B-IR de-mosaicing processor or algorithm 120' or the like, which provides or generates an output (such as an RGB color output and an IR output), and the system may include a normal and low light image switch 124 that determines whether or not to display the captured color images or the captured IR or NIR images at the display device 116. The switch may adjust the displayed images in response to the ambient light level at the scene being above or below a threshold level.

Figure 10:
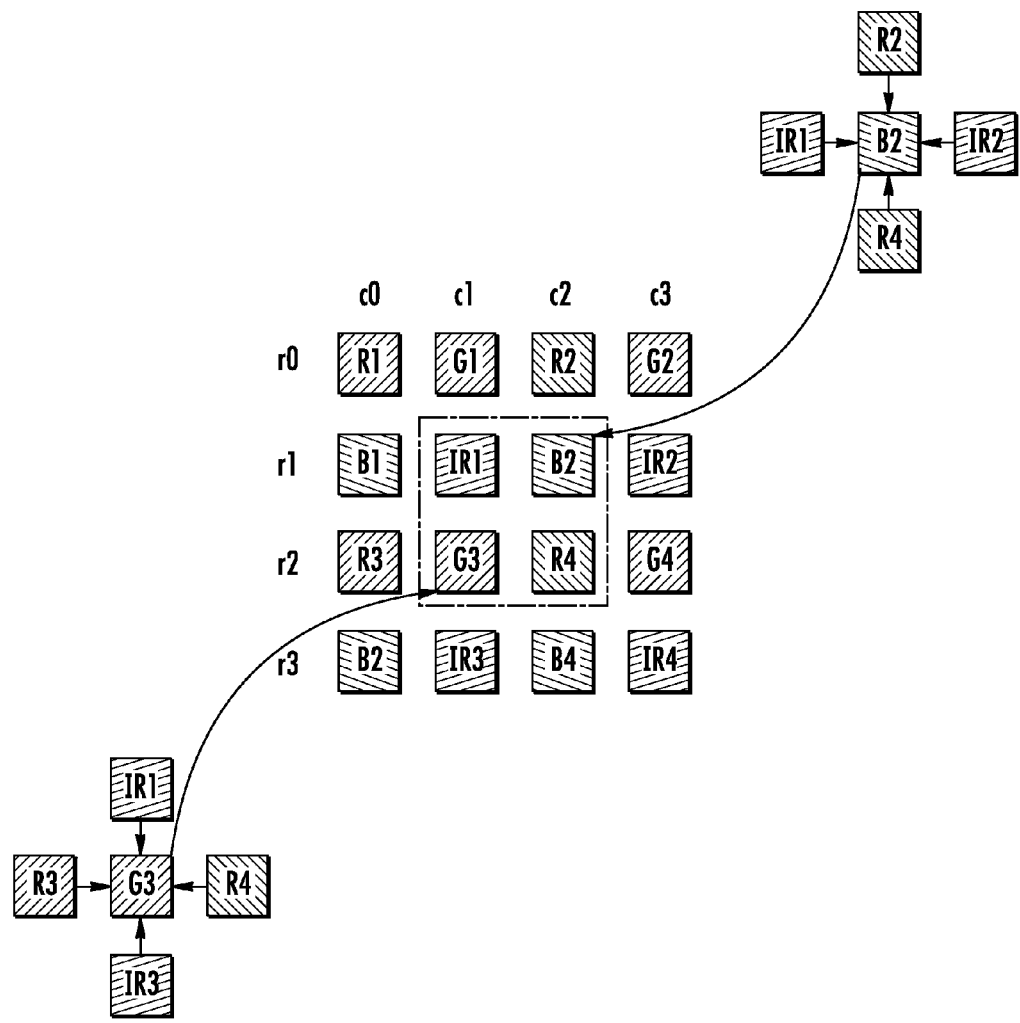
FIG. 10 is a schematic of a de-mosaicing technique for low light imaging in accordance with the present invention.

To further increase the signal strength and sensitivity of the low light images, it is desirable to use all the available photons that the imager can detect in the NIR and visible wavelength ranges. The red and IR pixels are more sensitive to the light sources in low light night conditions, which includes incandescent bulb tail lights, an added NIR illuminator, garage lamp lights, street lights, and the like, than green and blue pixels, since most of these lights have stronger red and NIR spectrum range components than green and blue spectrum range components. To take advantage of this feature, a de-mosaicing method of the present invention may be implemented to extract the desired image color components. As can be seen with reference to FIG. 10, the pixel values from the green and blue pixels are not used for the image processing in this method. Instead, the combined values coming from the surrounding red and IR pixels are used to represent the pixel values of green and blue pixels. In this method, the imager is treated as a substantially monochrome imager. Each pixel produces only one grey scale value.

Figure 11:
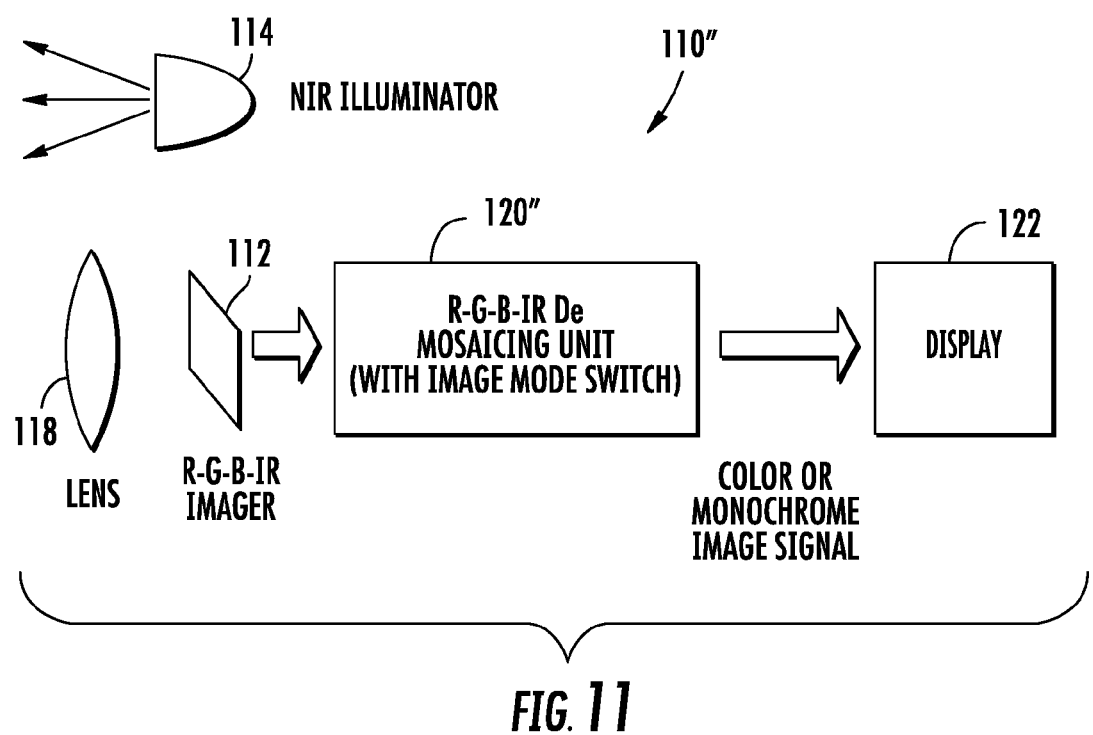
FIG. 11 is a schematic of a rear viewing camera and display for displaying color images under normal lighting conditions and/or monochrome images under low lighting conditions in accordance with the present invention.

The switching between normal color image and low light monochrome image may be done in an imager de-mosaicing unit. For example, and with reference to FIG. 11, a rear viewing camera system 110" may include an R-G-B-IR imager or imaging device or camera 112 and associated lens or optic 118, a NIR illuminator or illumination source 114 (such as a NIR LED or the like) and a display device 116. The system 110" includes an R-G-B-IR de-mosaicing processor or algorithm 120", which includes an image mode switch such as described above, and which provides or generates an output (such as an RGB color output or color image signal and a monochrome output or monochrome image signal), whereby the display device 116 displays the color image or monochrome image in response to the de-mosaicing unit.

Optionally, the imaging sensor may include a plurality of sub-arrays, such as a plurality of 2×2 sub-arrays or the like, that may each comprise a principally red sensing pixel, a principally blue sensing pixel, a principally green sensing pixel and a principally IR or near IR sensing pixel, as discussed above, or may include other types of sub-arrays having different arrangements of pixels such as one or more principally IR or NIR sensing pixels and one or more color sensing pixels. For example, an imaging sensor may include a plurality of sub-arrays where each sub-array may comprise a color sensing pixel (such as a pixel primarily sensing red light from the red region of the spectrum, blue light from the blue region of the spectrum or green light from the green region of the spectrum, such as may be achieved by placing a color filter in front of or over the respective pixel) and a clear pixel (that has a clear spectral filter or no spectral filter and is receptive to all or substantially all incoming visible and infrared light or energy incident thereon) and a principally IR or NIR sensing pixel (such as a principally IR or NIR sensing pixel as described above). Such an imaging sensor may function in a similar manner as described above, where the IR value (as sensed by the principally IR or NIR sensing pixel) may be subtracted by the accompanying image processor from the color value sensed by the color pixel and the clear value sensed by the clear pixel to obtain a more accurate or true color response for the color and clear pixels and to limit or avoid infrared color wash-out. Clearly, other arrangements of pixels and filters, such as an imaging sensor having a sub-array having one or more color sensing pixels and/or one or more clear pixels and one or more principally IR or NIR sensing pixels, such as an imaging sensor having three pixel sub-arrays or 2×2 sub-arrays or 3×3 sub-arrays or the like, may be implemented with one or more IR or NIR sensing pixels while remaining within the spirit and scope of the present invention.

A benefit of the present invention is that a principally IR or NIR sensing pixel is in close proximity and optionally contiguous with the associated cluster of spectrally selective and/or clear pixels (such as red, green and/or blue pixels and/or clear pixels), so that the image data associated with a particular object in the field of view being imaged (such as, for example, a headlamp or taillight in a forward field of view or a child or object in a rearward field of view or a vehicle or object in a forward field of view or a child or seat occupant in an interior cabin field of view or the like) can be processed to subtract out or account for the IR or NIR content of light or energy in the field of view by subtracting out the IR or NIR values (as sensed by the principally IR or NIR sensing pixel) from the other pixels of a particular sub-array of pixels (that images the headlamp or taillight or object or child or occupant that is in the field of view of the imaging sensor) to enhance the image output and/or to obtain a more accurate or true color response for the pixels and to limit or avoid infrared color wash-out. Thus, the IR or NIR values local to or associated with an illumination source or object being sensed by a respective sub-array of the imaging sensor may be subtracted from the color values or clear spectral values sensed by the color and/or clear pixels of that respective sub-array (with the color and/or clear pixels of the sub-array being proximate to or associated with the principally IR or NIR sensing pixel or pixels of that sub-array), so that the system may provide enhanced detection of and/or identification of the illumination sources or objects exterior or interior of the vehicle that are being imaged by the imaging sensor and system.

Optionally, the imaging sensor may be suitable for various forward imaging systems, such as for headlamp control systems, rain sensor systems, lane departure warning systems, object detection systems, and/or the like. For example, the imaging sensor of the present invention may be associated with one or more systems of the types described in U.S. Pat. Nos. 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties.

Optionally, the imaging sensor may be suitable for various in-cabinet imaging systems, such as driver drowsiness monitoring, passenger identification for intelligent airbag deployment, back seat passenger monitoring, and/or the like.

Optionally, the imaging sensor may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging and/or indicating systems described in U.S. Pat. Nos. 7,038,577; 6,882,287; 6,198,409; 5,929,786; and/or 5,786,772, and/or U.S. patent application Ser. No. 11/315,675, filed Dec. 22, 2005; Ser. No. 11/239,980, filed Sep. 30, 2005; and/or Ser. No. 11/933,697, filed Nov. 1, 2007, and/or PCT Application No. PCT/US2006/026148, filed Jul. 5, 2006 and published Jan. 11, 2007 as International Publication No. WO 2007/005942, and/or PCT Application No. PCT/US07/082099, filed Oct. 22, 2007 and published May 2, 2008 as International Publication No. WO 2008/051910, and/or U.S.

provisional application Ser. No. 60/618,686, filed Oct. 14, 2004 by Laubinger for VEHICLE IMAGING SYSTEM; Ser. No. 60/853,850, filed Oct. 24, 2006; Ser. No. 60/918,089, filed Mar. 15, 2007; Ser. No. 60/970,687, filed Sep. 7, 2007; and/or Ser. No. 60/857,025, filed Nov. 6, 2006, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 6,757,109; and/or 7,005,974, and/or of the rain sensors described in U.S. Pat. Nos. 6,250,148 and 6,341,523, and/or of other imaging systems, such as the types described in U.S. Pat. Nos. 7,123,168; 6,353,392 and 6,313,454, with all of the above referenced U.S. patents, patent applications and provisional applications and PCT applications being commonly assigned and being hereby incorporated herein by reference in their entireties.

Optionally, the mirror assembly and/or accessory module or windshield electronics module may include one or more displays, such as for displaying the captured images or video images captured by the imaging sensor or sensors of the vehicle, such as the displays of the types disclosed in U.S. Pat. Nos. 7,004,593; 5,530,240 and/or 6,329,925, which are hereby incorporated herein by reference, and/or display-on-demand or transflective type displays, such as the types disclosed in U.S. Pat. Nos. 7,274,501; 7,255,451; 7,195,381; 7,184,190; 6,690,268; 5,668,663 and/or 5,724,187, and/or in U.S. patent application Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY, and/or PCT Application No. PCT/US03/40611, filed Dec. 19, 2003 by Donnelly Corp. et al. for ACCESSORY SYSTEM FOR VEHICLE, and/or PCT Application No. PCT/US2006/018567, filed May 15, 2006 by Donnelly Corp. et al., which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or PCT Application No. PCT/US07/042718, filed Oct. 31, 2006 and published May 10, 2007 as International Publication No. WO 07/053710, and/or U.S. patent application Ser. No. 10/538,724, filed Jun. 13, 2005 by Hutzel et al. for ACCESSORY SYSTEM FOR VEHICLE; and/or Ser. No. 11/284,543, filed Nov. 22, 2005, now U.S. Pat. No. 7,370,983, and/or U.S. provisional application Ser. No. 60/732,245, filed Nov. 1, 2005; Ser. No. 60/759,992, filed Jan. 18, 2006; and/or Ser. No. 60/836,219, filed Aug. 8, 2006 by Weller et al. for INTERIOR REARVIEW MIRROR ASSEMBLY WITH DISPLAY, which are hereby incorporated herein by reference.

The imaging sensor may be incorporated at or in an accessory module or windshield electronics module (such as described above), or may be incorporated at or in an interior rearview mirror assembly of the vehicle, while remaining within the spirit and scope of the present invention. Optionally, the accessory module may utilize aspects of other accessory modules or windshield electronics modules or the like, such as the types described in U.S. patent application Ser. No. 11/201,661, filed Aug. 11, 2005, and/or U.S. Pat. Nos. 7,188,963; 7,004,593; 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

Optionally, the mirror assembly and/or module may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; 7,249,860; 7,195,381; and/or 5,669,698, which are hereby incorporated herein by reference in their entireties, may be included in the mirror assembly or module. The illumination sources and/or the circuit board may be connected to one or more buttons or inputs for activating and deactivating the illumination sources. Optionally, the mirror assembly or module may also or otherwise include other accessories, such as microphones, such as analog microphones or digital microphones or the like, such as microphones of the types disclosed in U.S. Pat. Nos. 6,243,003; 6,278,377; and/or 6,420,975, and/or in U.S. patent application Ser. No. 10/529,715, filed Mar. 30, 2005. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Changes and modifications to the specifically described embodiments may be carried out without departing from the principles of the present invention, which is intended to be limited by the scope of the appended claims, as interpreted in accordance with the principles of patent law.

The invention claimed is:

1. An imaging system suitable for use in a vehicle, said imaging system comprising:

an imaging sensor comprising a two-dimensional array of photosensing elements, said two-dimensional array comprising a plurality of sub-arrays, wherein each sub-array of said sub-arrays comprises four photosensing pixels, and wherein a first pixel of said sub-array primarily senses infrared radiation and a second pixel of said sub-array primarily senses red visible light;

wherein said imaging sensor is configured to be disposed at a vehicle equipped with said imaging system and wherein, when said imaging sensor is disposed at the equipped vehicle, said imaging sensor has a field of view forwardly of the equipped vehicle through a windshield of the equipped vehicle;

an image processor for processing image data captured by said imaging sensor, wherein said image processor processes outputs of said four photosensing pixels of said sub-array, said image processor processing an output of said first pixel of said sub-array to determine an infrared component of the imaged scene and said image processor processing an output of said second pixel of said sub-array to determine a red visible light component of the imaged scene;

wherein, responsive at least in part to determination of a red visible light component of the imaged scene via said processing of the output of said second pixel of said sub-array and with said imaging sensor disposed at the equipped vehicle and viewing forwardly through the windshield, said imaging system is operable to detect at least one of (i) a headlight of a vehicle ahead of the equipped vehicle (ii) a taillight of a vehicle ahead of the equipped vehicle and (iii) a traffic sign;

wherein a near infrared illumination source is disposed at the equipped vehicle and is operable to emit near infrared illumination to illuminate forward of the equipped vehicle to enhance nighttime viewing by said imaging sensor, and wherein said near infrared illumination source, when activated, illuminates at least a portion of the forward field of view of said imaging sensor with near infrared illumination; and wherein, responsive at least in part to determination of an infrared component of the imaged scene via said processing of the output of said first pixel of said sub-array and with said imaging sensor disposed at the equipped vehicle and viewing forwardly through the windshield, said imaging system is operable to detect reflections by objects located forward of the equipped vehicle of near infrared illumination emitted by said near infrared illumination source of the equipped vehicle.

2. The imaging system of claim 1, wherein said image processor processes image data via a de-mosaicing technique.

3. The imaging system of claim 2, wherein a third pixel of said sub-array primarily senses a third color and a fourth pixel of said sub-array primarily senses a fourth color, and wherein said image processor processes image data to determine the color values at each pixel location of said sub-array via the following equations:

$R(r0c0)=R1-A_R*IR1, G(r0c0)=G1-A_G*IR1, B(r0c0)=B1-A_B*IR1,$ and $IR(r0c0)=IR1;$ $R(r0c1)=R1-A_R*IR1, G(r0c1)=G1-A_G*IR1, B(r0c1)=B1-A_B*IR1,$ and $IR(r0c1)=IR1;$ $R(r1c0)=R1-A_R*IR1, G(r1c0)=G1-A_G*IR1, B(r1c0)=B1-A_B*IR1,$ and $IR(r1c0)=IR1;$ $R(r1c1)=R1-A_R*IR1, G(r1c1)=G1-A_G*IR1, B(r1c1)=B1-A_B*IR1,$ and $IR(r1c1)=IR1,$ where $A_R, A_G,$ and $A_B$ are the selected factors for said second pixel, said third pixel and said fourth pixel, respectively, and where R(rx,cx) is the red color value for the respective pixel location, G(rx,cx) is the third color value for the respective pixel location, B(rx,cx) is the fourth color value for the respective pixel location, and IR(rx,cx) is the infrared value for the respective pixel location, and where R1 is an output value of said second pixel, G1 is an output value of said third pixel, B1 is an output value of said fourth pixel and IR1 is an output value of said fourth first pixel.

4. The imaging system of claim 2, wherein a third pixel of said sub-array senses primarily a third color and a fourth pixel of said sub-array senses primarily a fourth color, and wherein said image processor processes image data from multiple sub-arrays to determine the color values at each pixel location of said sub-arrays via the following equations:

$R(r0c0)=R1-A_R*IR1, G(r0c0)=G1-A_G*IR1, B(r0c0)=B1-A_B*IR1,$ and $IR(r0c0)=IR1;$ $R(r0c1)=R2-A_R*IR1, G(r0c1)=G1-A_G*IR1, B(r0c1)=B2-A_B*IR1,$ and $IR(r0c1)=IR1;$ $R(r1c0)=R3-A_R*IR1, G(r1c0)=G3-A_G*IR1, B(r1c0)=B1-A_B*IR1,$ and $IR(r1c0)=IR1;$ $R(r1c1)=R4-A_R*IR1, G(r1c1)=G3-A_G*IR1, B(r1c1)=B2-A_B*IR1,$ and $IR(r1c1)=IR1,$ where $A_R, A_G,$ and $A_B$ are the selected factors for said second pixel, said third pixel and said fourth pixel, respectively, and where R(rx,cx) is the red color value for the respective pixel location, G(rx,cx) is the third color value for the respective pixel location, B(rx,cx) is the fourth color value for the respective pixel location, and IR(rx,cx) is the infrared value for the respective pixel location, and where Rx is an output value of said second pixel of a respective sub-array, Gx is an output value of said third pixel of a respective sub-array, Bx is an output value of said fourth pixel of a respective sub-array and IRx is an output value of said first pixel of a respective sub-array.

5. The imaging system of claim 2, wherein a third pixel of said sub-array senses primarily a third color and a fourth pixel of said sub-array senses primarily a fourth color, and wherein said image processor processes image data from multiple sub-arrays to determine the color values at each pixel location of said sub-arrays via the following equations:

$R(r1c1)=(R1+R2+R3+R4)/4-A_R*IR1, G(r1c1)=(G1+G3)/2-A_G*IR1, B(r1c1)=(B1+B2)/2-A_B*IR1,$ and $IR(r0c0)=IR1;$ $R(r1c2)=(R2+R4)/2-A_R*(IR1+IR2)/2, G(r1c2)=(G1+G2+G3+G4)/4-A_G*(IR1+IR2)/2, B(r0c1)=B2-A_B*(IR1+IR2)/2,$ and $IR(r0c1)=(IR1+IR2)/2;$ $R(r2c1)=(R3+R4)/2-A_R*(IR1+IR3)/2, G(r2c1)=G3-A_G*(IR1+IR3)/2, B(r2c1)=(B1+B2+B3+B4)/4-A_B*(IR1+IR3)/2,$ and $IR(r2c1)=(IR1+IR3)/2;$ $R(r2c2)=R4-A_R*(IR1+IR2+IR3+IR4)/4, G(r1c1)=(G3+G4)/2-A_G*(IR1+IR2+IR3+IR4)/4, B(r2c2)=(B2+B4)/2-A_B*(IR1+IR2+IR3+IR4)/4,$ and $IR(r2c2)=(IR1+IR2+IR3+IR4)/4,$ where $A_R, A_G,$ and $A_B$ are the selected factors for said second pixel, said third pixel and said fourth pixel, respectively, and where R(rx,cx) is the red color value for the respective pixel location, G(rx,cx) is the third color value for the respective pixel location, B(rx,cx) is the fourth color value for the respective pixel location, and IR(rx,cx) is the infrared value for the respective pixel location, and where Rx is an output value of said second pixel of a respective sub-array, Gx is an output value of said third pixel of a respective sub-array, Bx is an output value of said fourth pixel of a respective sub-array and IRx is an output value of said first pixel of a respective sub-array.

6. The imaging system of claim 1, wherein a third pixel of said sub-array primarily senses color in a green spectral band, and a fourth pixel of said sub-array primarily senses color in a blue spectral band.

7. The imaging system of claim 1, wherein said image processor is operable to generate an output indicative of either a color image or a monochromatic image.

8. The imaging system of claim 7, wherein said image processor generates said output indicative of a color image in response to an ambient light level being greater than a threshold level, and wherein said image processor generates said output indicative of a monochromatic image in response to an ambient light level being lower than a threshold level.

9. The imaging system of claim 1, wherein said imaging system is associated with at least one of an automatic headlamp control system, a lane departure warning system, an object detection system, a night vision system, a rain sensing system, and a reverse aid system.

10. The imaging system of claim 1, wherein said near infrared illumination source comprises at least one of (i) a near infrared light-emitting light emitting diode and (ii) a near infrared light-emitting laser.

11. The imaging system of claim 1, wherein, responsive at least in part to determination of a red visible light component of the imaged scene via said processing of the output of said second pixel of said sub-array and with said imaging sensor disposed at the equipped vehicle and viewing forwardly through the windshield, said imaging system is operable to detect traffic signs.

12. The imaging system of claim 1, wherein said imaging system is associated with an intelligent headlamp control system.

13. The imaging system of claim 12, wherein said imaging system utilizes a pulse width modulated infrared output to enhance identification accuracy of objects.

14. The imaging system of claim 1, wherein said third of said sub-array primarily senses blue visible light and said fourth pixel primarily senses green visible light.

15. The imaging system of claim 1 further comprising a display for displaying images, and wherein the displayed images are at least in part derived from image data output by said image processor.

16. The imaging system of claim 1, wherein said image processor subtracts the infrared component from said outputs of the other pixels of said sub-array to obtain a more accurate or true color response for the pixels and to limit or avoid infrared color wash-out.

* * * * *

UNITED STATES PATENT AND TRADEMARK OFFICE
CERTIFICATE OF CORRECTION

PATENT NO. : 8,446,470 B2
APPLICATION NO. : 12/681204
DATED : May 21, 2013
INVENTOR(S) : Yuesheng Lu et al.

It is certified that error appears in the above-identified patent and that said Letters Patent is hereby corrected as shown below:

In the Specification

Column 3
Line 62, "12h" should be "12B"

In the Claims

Column 15
Line 33, Claim 1, Insert -- , -- after "vehicle" and before "(ii)"

Column 16
Line 12, Claim 3, Delete "fourth" after "said"

Column 18
Line 14, Claim 14, Insert -- pixel -- after "third"

Signed and Sealed this
Tenth Day of December, 2013

Margaret A. Focarino
*Commissioner for Patents of the United States Patent and Trademark Office*